March 24, 1959   C. E. NICHOLS ET AL   2,878,704
CONTROL SYSTEM
Filed March 30, 1956

INVENTORS
CHARLES E. NICHOLS
BY SAMUEL W. BURDGE

AGENT

2,878,704

CONTROL SYSTEM

Charles E. Nichols and Samuel W. Burdge, Sidney, Ohio, assignors to The Monarch Machine Tool Co., Sidney, Ohio, a corporation of Ohio Application March 30, 1956, Serial No. 575,056

2 Claims. (Cl. 82—34)

This invention relates to machinery wherein it is necessary to supply a movable element with hydraulic power. The supply normally consists of one or more pressure lines leading from pumps, valves, or other control units and these lines are usually in the form of single hoses connected to the movable member. On the movable members there may be other hydraulic components such as motors and control valves connected to the hydraulic circuit. Of course, a drain line is necessary to return the spent hydraulic oil to the sump from which it is drawn by the pump.

It is an object of this invention to provide means by which the hoses connected to the movable member are kept under control and out of the way to prevent damage by abrasion and kinking which could occur if the hoses were left uncontrolled.

It is another object of this invention to provide means to hold the hoses in a definite condition so that they may have long life and present a pleasing appearance.

It is a further object to arrange the hoses and control them so there is no undue drag on the movable member.

It is another object to provide means whereby electric wires may be controlled in the same manner when they are arranged in bundles or drawn through flexible conduits.

Figure 1:
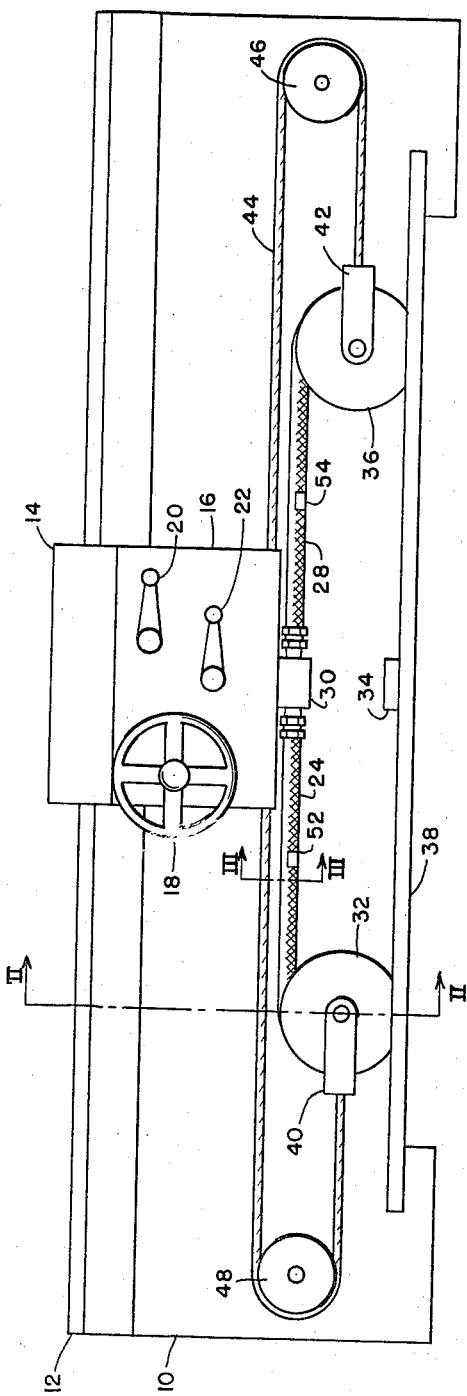
Figure 3:
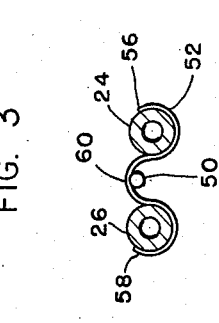
Figure 2:
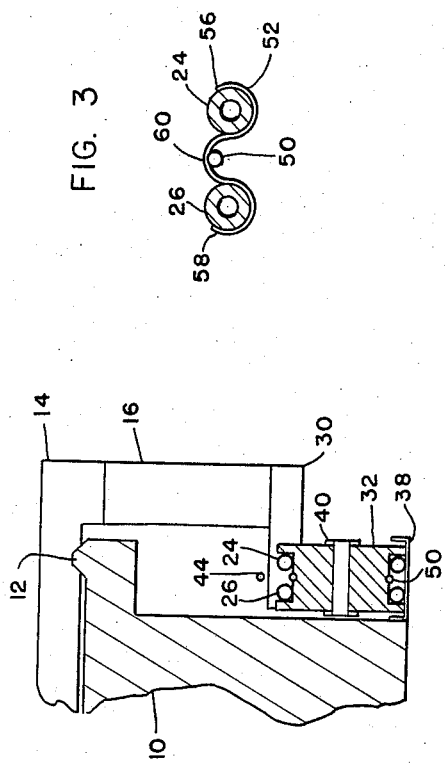

Other objects and advantages of this invention will appear from the following specification and the attached drawing in which:

Figure 1 shows a schematic front elevation of the invention as applied to a machine tool, Figure 2 shows a partial section taken on the line II—II of Figure 1, and Figure 3 shows a partial section taken on the line III—III of Figure 1.

Referring now to the drawings, it is seen that the embodiment in question in Figure 1 includes a lathe having a bed 10 and upon the bed are arranged ways of which the front V 12 is shown. Slidably mounted thereupon is a carriage 14. Depending from the carriage 14 is an apron 16 which is controlled by means of handwheel 18 and one or more levers 20 and 22. The lathe is further supplied with the normal components known to those skilled in the art such as a headstock and a tailstock mounted on the bed to respectively rotate and support a work piece. Normally mounted on the carriage 14 are one or more slides for supporting a tool which may be controlled to engage and cut the work piece. The handwheel 18 is used to move the carriage 14 along the ways 12 by hand, and lever 22 is used to control hydraulically powered or controlled feed and/or traverse of the carriage 14 along the ways 12. The handle 20 is used to control powered feed and/or traverse of one of the slides superposed on the carriage 14 in a direction transversely of the direction of motion of the carriage to provide complete control of the tool in a single plane. The mechanical and hydraulic components of the apron 16 form no part of the present invention, but they may be of any of the common types known to those skilled in the art.

To supply the necessary hydraulic power and drain the hydraulic fluid back to the hydraulic sump, hoses 24, 26, and 28 are connected to a manifold block 30 mounted on the bottom of the apron. The hose hidden behind hose 28 may alternatively supply hydraulic fluid under pressure or may have a harness of electric wires pulled through a braided flexible electrical conduit such as is commercially available.

The hoses 24 and 26 pass around a drum 32 and are connected to a hydraulic manifold 34 which is in turn connected to the stationary hydraulic system within the machine tool. Similarly, hose 28 passes around drum 36 and is connected to the hydraulic manifold 34. A flexible conduit for electric wiring would be secured at its ends in a similar manner, and the wiring would be connected to both the movable and stationary electrical control circuit. The drums 32 and 36 roll within a channel 38 which supports and guides them and attached to the drums 32 and 36, respectively, are yokes 40 and 42. Attached to these yokes is a continuous cable 44 which passes over wheels 46 and 48 which are mounted on studs secured to the bed 10. The cable 44 passes freely behind the apron. Means is provided to adjust the cable 44 so that the proper tension can be applied to the yokes 40 and 42, to prevent them from permitting the hose to become too loose on the drums 32 and 36. In order to prevent too much tension on the hoses 24 and 26, a cable 50 is also passed around the drum 32 and this cable 50 is secured at its ends to manifolds 30 and 34. Cable 50 is adjusted to be slightly shorter than the hoses 24 and 26 so that the tension in cable 44 is passed on the cable 50, thus preventing undue stresses on the hoses 24 and 26. A cable similar to cable 50 is passed around drum 36 and secured to manifolds 30 and 34 to prevent undue tension on hose 28.

It can be seen from Figure 1 that the hoses extending from manifold 30 to the drums 32 and 36 are virtually unsupported by tension in the hoses and therefore supporting clips 52 and 54 are provided. These are shown in Figure 3 and consist of members which are bent to embrace the hoses around more than 180° of their circumference as shown at 56 and 58. Between the embracing portions of the clip 52, the center section is bent upwardly as shown at 60 to form a portion which can be supported by cable 50. Thus in the free runs of hoses 24, 26, and 28 between their drums 32 and 36 and the manifold 30, the hoses are appropriately supported by means of clips appropriately spaced to prevent undue sagging of the hoses.

While this invention has been described with relation to a lathe, it is clear that it is useful in any application where hydraulic power must be supplied to a linearly moving member. While this invention has been shown and described in its preferred embodiment, it is clear that it is susceptible to various modifications within the scope of the invention and thus it is desired that the scope be defined by the appended claims.

What we claim is:

1. In a machine tool having a bed, a carriage arranged to reciprocate along the bed, first and second drums arranged to move relatively to the bed, first and second wheels rotatably secured relatively to the bed, a first flexible tension element of substantially fixed length secured to said first and second drums and passing over said first and second wheels to keep said drums apart by a substantially fixed distance, second and third flexible tension elements of substantially fixed length secured to said bed and to said carriage with said second flexible tension element of substantially fixed length passing over said first drum and said third flexible tension element of substantially fixed length passing over said second drum to keep said first and second drums from going farther apart and to keep said first flexible tension element tensioned, first and second flexible energy conducting members of substantially fixed length secured to said bed and to said carriage and respectively passing around said first and second drums, said first and second flexible energy conducting members being of such length that they are free of substantial tension, clips embracing said first and second flexible energy conducting members, said clips being curved to releasably engage said second and third flexible tension elements of substantially fixed length, said tension elements contacting said drums while engaged with said drums and contacting said clips in other locations along the length of said tension elements whereby the motion of said drums and said flexible energy conducting members are controlled without substantial tension on said energy conducting members.

2. In a device having a frame, a member movable upon said frame, and flexible energy conducting members connected between said frame and said movable member, the improvement comprising: first and second flexible energy conducting members of substantially fixed length, first and second drums arranged for motion relative to said frame, said first and second flexible energy conducting members passing over said first and second drums respectively, first and second wheels secured to said frame for rotary motion relative thereto, a first tension element of substantially fixed length secured to said first and second drums and passing over said first and second wheels to hold said first and second drums apart, second and third flexible tension elements of substantially fixed length secured to said frame and to said movable member and passing over said first and second drums respectively to hold said drums together, clips embracing said first and second flexible energy conducting members, said clips being curved to releasably engage said second and third flexible tension elements of substantially fixed length, said tension elements contacting said drums while engaged with said drums and contacting said clips in other locations along the length of said tension elements whereby the motion of said drums and the tension in the flexible energy conducting members are controlled and the flexible energy conducting members are maintained in their correct alignment.

References Cited in the file of this patent

UNITED STATES PATENTS

| | | |
|---|---|---|
| 310,938 | Gilliland | Jan. 20, 1885 |
| 1,760,323 | Shelton | May 27, 1930 |
| 2,725,431 | Rushworth | Nov. 29, 1955 |

FOREIGN PATENTS

| | | |
|---|---|---|
| 309,871 | Germany | Dec. 20, 1918 |
| 742,767 | Great Britain | Jan. 4, 1956 |